(12) United States Patent
Schalaster

(10) Patent No.: US 11,364,560 B2
(45) Date of Patent: Jun. 21, 2022

(54) METHOD FOR GRINDING FINISH MACHINING OF GEARWHEELS

(71) Applicant: Klingelnberg GmbH, Hückeswagen (DE)

(72) Inventor: Rolf Schalaster, Wermelskirchen (DE)

(73) Assignee: Klingelnberg GmbH, Huckeswagen (DE)

( * ) Notice: Subject to any disclaimer, the term of this patent is extended or adjusted under 35 U.S.C. 154(b) by 345 days.

(21) Appl. No.: 16/413,800

(22) Filed: May 16, 2019

(65) Prior Publication Data

US 2019/0351496 A1   Nov. 21, 2019

(30) Foreign Application Priority Data

May 16, 2018   (DE) .......................... 102018111814.7

(51) Int. Cl.
| | |
|---|---|
| *B23F 23/00* | (2006.01) |
| *B23F 19/05* | (2006.01) |
| *B23F 23/12* | (2006.01) |
| *B23F 19/00* | (2006.01) |
| *B23F 19/12* | (2006.01) |

(Continued)

(52) U.S. Cl.
CPC .......... *B23F 23/006* (2013.01); *B23F 19/005* (2013.01); *B23F 19/055* (2013.01); *B23F 19/12* (2013.01); *B23F 23/1218* (2013.01); *B23F 23/1231* (2013.01); *B23P 15/14* (2013.01);
(Continued)

(58) Field of Classification Search
CPC .. B23F 1/026; B23F 5/02; B23F 9/025; B23F 19/12; B23F 19/055; B23F 19/005; B23F 19/06; B23F 23/006; B23F 23/1218; B23F 23/1231; B23P 15/14
See application file for complete search history.

(56) References Cited

U.S. PATENT DOCUMENTS

| | | | |
|---|---|---|---|
| 6,234,880 B1 | 5/2001 | Scacchi | |
| 2015/0165581 A1* | 6/2015 | Nagata | ...................... B24C 1/02 451/37 |

FOREIGN PATENT DOCUMENTS

| | | |
|---|---|---|
| DE | 10211129 A1 | 10/2003 |
| DE | 102016117962 A1 | 3/2018 |

(Continued)

OTHER PUBLICATIONS

Search Report in German Patent Application No. DE 10 2018 111 814.7, dated Jun. 4, 2019, 6 pages.

*Primary Examiner* — Christopher J Besler
*Assistant Examiner* — Christine Bersabal
(74) *Attorney, Agent, or Firm* — McCarter & English, LLP

(57) ABSTRACT

A method for the grinding finish machining of an already toothed gearwheel workpiece in an NC-controlled machine tool, comprising the following steps:
  a. providing the gearwheel workpiece in the machine tool,
  b. providing a first grinding tool in the machine tool,
  c. providing a second grinding tool in the machine tool,
  d. grinding machining of at least one tooth flank of the gearwheel workpiece using the first grinding tool,
  e. grinding machining of at least one tooth flank in the transition region to the tooth head of the gearwheel workpiece using the second grinding tool in the machine tool to generate a head edge rounding on the gearwheel workpiece, (Continued)

f. further grinding machining of at least one tooth flank of the gearwheel workpiece using the first grinding tool and/or the second grinding tool in the machine tool.

19 Claims, 3 Drawing Sheets

(51) Int. Cl.
    *B23P 15/14*     (2006.01)
    *B23F 19/06*     (2006.01)
    *B23F 1/02*     (2006.01)
    *B23F 9/02*     (2006.01)

(52) U.S. Cl.
    CPC ............... *B23F 1/026* (2013.01); *B23F 9/025* (2013.01); *B23F 19/06* (2013.01)

(56) References Cited

FOREIGN PATENT DOCUMENTS

| | | |
|---|---:|---|
| EP | 2891539 A1 | 7/2015 |
| EP | 3120960 A1 | 1/2017 |
| WO | 2017201385 A1 | 11/2017 |

* cited by examiner

METHOD FOR GRINDING FINISH MACHINING OF GEARWHEELS

CROSS-REFERENCE TO RELATED APPLICATIONS

This application claims priority under 35 U.S.C. §§ 119 (a)-(d) to German patent application no. DE 10 2018 111 814.7 filed May 16, 2018, which is hereby expressly incorporated by reference as part of the present disclosure.

FIELD OF THE INVENTION

The present disclosure relates to a method for grinding finish machining of gearwheels, for example bevel gears.

BACKGROUND

In helicopters, bevel gears (also called rotor gears) are used in the region of the drivetrain which drives the rotor. Such a bevel gear can comprise a pinion and a crown wheel to be able to transmit rotational movements between two shafts which are not parallel and ensure a step-down ratio.

The demands on such bevel gears are particularly high in the case of helicopters, for example. In addition to higher power density and good emergency mode properties, the transmission housing, which is embodied in a light construction, results in additional demands on the running capability in the case of large relative displacements. The production tolerances, which apply to the production of such bevel gears, are accordingly precise.

Since the bearings of gears which are used in air travel have to be as light as possible, slight twists can occur. Such a twist can have the result that the axial position of two gearwheels, which are paired with one another in a gear, changes slightly. To ensure problem-free rolling of the gearwheels even upon the occurrence of higher torques, head edge roundings are provided in the transition region between the tooth flanks and the tooth head.

For example, bevel gears having ground tooth flanks which have a quality of 3, and the teeth of which are provided with head edge roundings, are used for applications in aviation.

SUMMARY

It is therefore an objective to provide a method which enables a high-precision and tolerance-maintaining manufacturing of head edge roundings. The manufacturing of the head edge roundings is to be efficient and reproducible.

This object is achieved according to at least some embodiments by a method for the grinding finish machining of an already toothed gearwheel workpiece, wherein this method is executed in an NC-controlled machine tool. The method comprises the following steps:
  a. providing the gearwheel workpiece in the machine tool,
  b. providing a first grinding tool in the machine tool,
  c. providing a second grinding tool in the machine tool,
  d. grinding machining of at least one tooth flank of the gearwheel workpiece using the first grinding tool in the machine tool,
  e. grinding machining of at least one tooth flank in the transition region to the tooth head of the gearwheel workpiece using the second grinding tool in the machine tool to generate a head edge rounding,
  f. further grinding machining of at least one tooth flank of the gearwheel workpiece using the first grinding tool and/or the second grinding tool in the machine tool.

According to at least some embodiments, at least steps d., e., and f. are carried out in the mentioned sequence, since this special succession of the steps enables a high-precision manufacturing of the head edge roundings and since burrs which possibly can arise in the region of the tooth flanks in step e. can be reliably removed in step f.

In at least some embodiments, the method is executed so that in step d., all concave tooth flanks of the gearwheel workpiece and/or all convex tooth flanks of the gearwheel workpiece are ground using the first grinding tool before multiple head edge roundings are generated in step e.

In at least some embodiments, steps d., e., and f. are executed in one chucking of the gearwheel workpiece in the machine tool. Due to this specification, re-chucking of the gearwheel workpiece is dispensed with. Such re-chucking can introduce inaccuracies into the method.

In at least some embodiments, the method is performed with a machine tool that comprises a first tool spindle for chucking the first grinding tool and a second tool spindle for chucking the second grinding tool. The method may be carried out efficiently and precisely in such a machine, which comprises two separate tool spindles.

In at least some embodiments
  a relative infeed movement is executed before step d., to move the first grinding tool into a starting position in relation to the gearwheel workpiece,
  a relative infeed movement is executed before step e., to move the second grinding tool into a starting position in relation to the gearwheel workpiece,
  a relative infeed movement is executed before step f., to move the first grinding tool into a starting position in relation to the gearwheel workpiece.

The method was developed to be carried out after a temperature treatment of the gearwheel workpiece since hardening distortions can be removed and the desired surface quality of the tooth flanks can be ground in the scope of steps d. and f. The method is also referred to as a method for grinding hard finish machining. However, the method can also be applied to soft gearwheel workpieces.

In at least some embodiments, in step e., the head edge roundings are generated by means of NC-controlled movements of the second grinding tool in relation to the gearwheel workpiece. Because the grinding of the head edge roundings is performed by the use/the control of an NC-controller, this procedure can be performed with high precision and dimensional accuracy.

In at least some embodiments, an NC-controller or a software module is used, which is part of the machine tool or which is connectable to the machine tool.

The method may be applied in at least some embodiments in the case of a gearwheel workpiece which is provided for use in a helicopter or aircraft.

The invention may be applied not only to bevel gears but rather it can also be applied, for example, in the case of spur gears.

This summary is not exhaustive of the scope of the aspects and embodiments of the invention. Thus, while certain aspects and embodiments have been presented and/or outlined in this summary, it should be understood that the inventive aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow, but in any case are not exhaustive or limiting.

It should also be understood that any aspects and embodiments that are described in this summary and elsewhere in this application and do not appear in the claims that follow are preserved for later presentation in this application or in one or more continuation patent applications.

BRIEF DESCRIPTION OF THE DRAWINGS

Exemplary embodiments of the invention, which are understood not to be limiting, will be described in greater detail hereafter with reference to the drawings.

DETAILED DESCRIPTION

Figure 1:
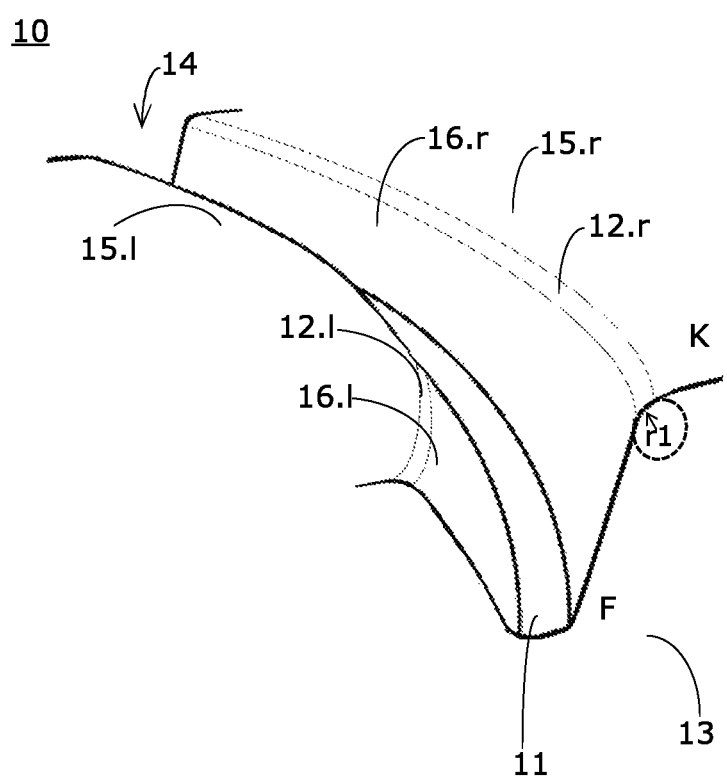
FIG. 1 schematically shows a perspective view of an exemplary bevel gear, wherein a single tooth gap is indicated, at the head edges of which edge roundings were generated.

FIG. 1 shows a portion of an exemplary bevel gear 10 to be able to define the essential elements and details on the basis of this bevel gear 10. The invention can also be applied to other gearwheels.

A tooth gap 14 can be seen in FIG. 1, which is delimited on the right by a right tooth flank 16.$r$ and on the left by a left tooth flank 16.1. A tooth head 15.$r$ can be seen on the right and a tooth head 15.1 can be seen on the left. The tooth gap 14 passes through the rear face 13 of the bevel gear 10. The two tooth flanks 16.$r$, 16.1 are connected to one another by a root 11. The tooth root of a tooth is identified here with F and the tooth head with K.

A head edge, which can be relatively sharp-edged, results in each case between the tooth flanks 16.$r$, 16.1 and the respective adjoining tooth head 15.$r$, 15.1. At least some embodiments relate to the precise grinding of these head edges to generate head edge roundings 12.$r$, 12.1. These head edge roundings 12.$r$, 12.1 are schematically shown in FIG. 1. Head edge phases can also be generated instead of head edge roundings using the invention. The term "head edge roundings" is also to comprise head edge phases.

The head edge roundings 12.$r$, 12.1 have a precisely specified rounding radius r1 after they are finished, which may be homogeneous along the head edges. I.e., the rounding radius r1 is identical in the region of the toe of the bevel gear 10 to the rounding radius r1 in the region of the heel.

In at least some embodiments, the head edge roundings 12.$r$, 12.1 are defined so that they have a rounding radius r1 which changes from the toe to the heel.

To be able to produce the head edge roundings 12.$r$, 12.1 with high precision and within specified manufacturing tolerances, a special method is used, the steps of which are described hereafter.

Figure 4:
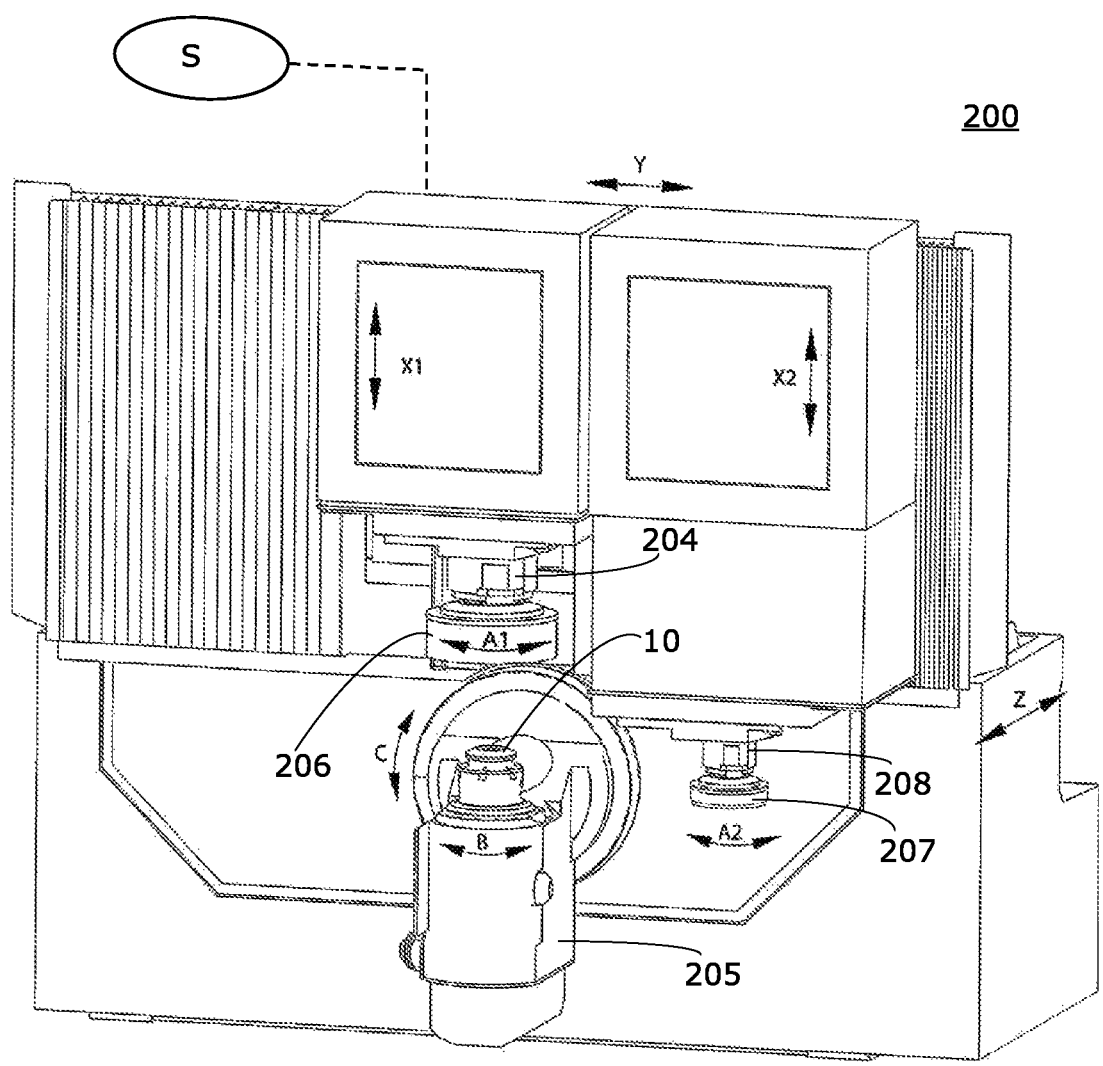
FIG. 4 shows a perspective view of a grinding machine.

Specifically, it is a method for grinding finish machining of an already toothed gearwheel workpiece 10 (for example, a bevel gear or a spur gear). The method is designed to be executed in an NC-controlled machine tool 200. An exemplary machine 200 is shown in FIG. 4.

Step a.: A gearwheel workpiece 10 is provided in the machine tool 200. The provision can comprise, for example, the (manual or automated) introduction of the gearwheel workpiece 10 into the machine tool 200 and the chucking on a tool spindle 205.

Step b.: The provision of a first grinding tool 206 in the machine tool 200 follows. In FIG. 4, a cup grinding wheel is used as the first grinding tool 206. The provision can comprise, for example, the (manual or automated) introduction of the grinding tool 206 into the machine tool 200 and the chucking on a first tool spindle 204.

Figure 3:
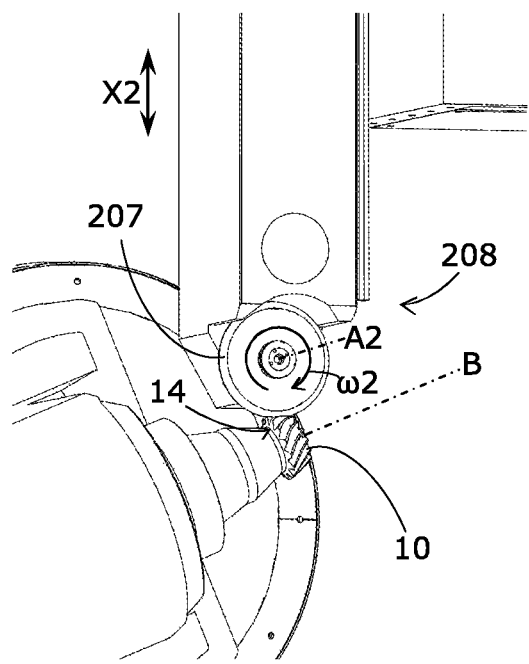
FIG. 3 schematically shows a perspective view of grinding machining of head roundings of the bevel gear pinion of FIG. 2.

Step c.: Furthermore, the method comprises the provision of a second grinding tool 207 in the machine tool 200. In FIG. 4, a smaller cup grinding wheel is used as the second grinding tool 207. Instead of a cup grinding wheel, however, a grinding wheel can also be used as the grinding tool 207, as shown in FIG. 3.

The provision can comprise, for example, the (manual or automated) introduction of the grinding tool 207 into the machine tool 200 and the chucking on a second tool spindle 208.

Steps a., b., and c. can also be executed in a different sequence in at least some embodiments, or they can be executed at least partially in parallel.

Step d.: After the preparatory steps a., b., and c., the grinding machining of the tooth flanks of the gearwheel workpiece 10 using the first grinding tool 206 in the machine tool 200 follows. In the scope of step d., the right tooth flank 16.$r$ and the left tooth flank 16.1 of a tooth gap can each be ground jointly. However, it is also possible to grind the right tooth flank 16.$r$ separately from the left tooth flank 16.1 of a tooth gap 14.

Figure 2:
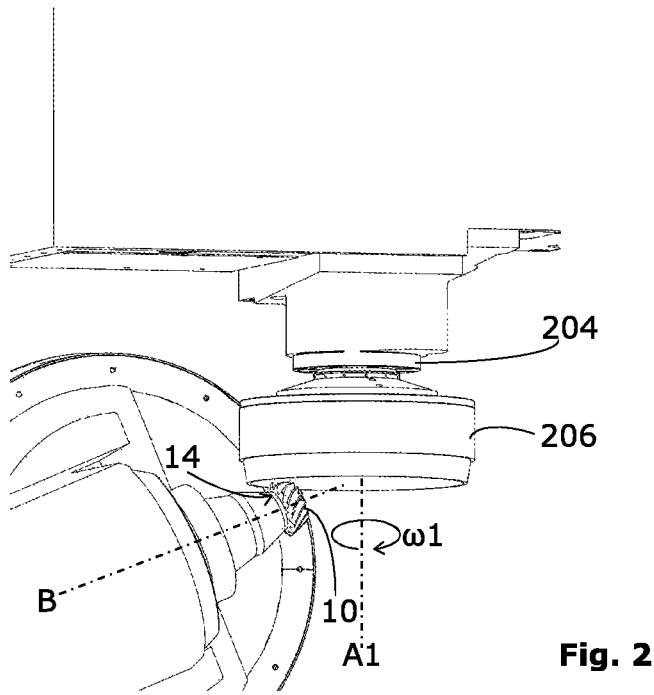
FIG. 2 schematically shows a perspective view of grinding machining of the tooth flanks of a bevel gear pinion.

In FIG. 2, the grinding machining of a tooth flank of the tooth gap 14 of the gearwheel workpiece 10 using the tool 206 is shown by way of example and in solely schematic form. Only a part of the teeth is shown on the gearwheel workpiece 10. The rotation of the tool 206 about the A1 axis is indicated by the angular velocity col. It can be seen in this schematic illustration that the axes B and A1 are inclined in relation to one another at the moment shown. During the grinding machining of a tooth flank, the gearwheel workpiece 10 is also moved in an NC-controlled manner (for example, rotated and moved linearly).

In at least some embodiments, step d. comprises a multistep grinding procedure, in which each of the tooth flanks 16.$r$, 16.1 is subjected to multiple grinding passes.

The grinding machining of the tooth flanks is then interrupted to perform, in a step e., the grinding machining of the tooth flanks 16.$r$, 16.1 in the transition region to the tooth head K of the gearwheel workpiece 10. According to at least some embodiments, the grinding of the transition region is performed using a second grinding tool 207. A different grinding tool is thus used here than in step d. The grinding machining of the transition region of the tooth flanks is performed without re-chucking in the same machine tool 200 to generate head edge roundings 12.$r$, 12.1 on the gearwheel workpiece 10, as indicated in FIG. 1. During the grinding machining of the head edge roundings 12.$r$, 12.1, the gearwheel workpiece 10 is also moved in an NC-controlled manner (for example, rotated and moved linearly).

Subsequently, in a step f., further grinding machining of the tooth flanks 16.$r$, 16.1 of the gearwheel workpiece 10 is performed, wherein here the first grinding tool 206 and/or the second grinding tool 207 is used in the machine tool 200.

It is important for this method that steps d., e., and f. are executed in one chucking of the gearwheel workpiece 10 in the machine tool 200, i.e., due to the use of a second grinding tool 207, grinding of the head edge roundings 12.$r$, 12.1 is possible without the gearwheel workpiece 10 having to be re-chucked. Such re-chucking can be accompanied by inaccuracies, or a greater effort is necessary to move the gearwheel workpiece 10 back into an accurately known position after re-chucking.

Furthermore, it is important that after the grinding of the head edge roundings 12.r, 12.1, at least one step f. also follows to rework the tooth flanks 16.r, 16.1 at least partially once again by grinding. It can be ensured by the execution of step f. that burrs do not remain standing in the region of the tooth flanks 16.r, 16.1. Such burrs can form under certain circumstances during the grinding of the head edge roundings 12.r, 12.1.

To be able to illustrate this procedure three-dimensionally, a perspective view of a gearwheel workpiece 10 (in the form of a bevel gear pinion here) and a cup grinding wheel 206 is shown by way of example in FIG. 2. The tooth gaps 14 or the tooth flanks, respectively, of the gearwheel workpiece 10 are ground in this example according to step d.

To be able to illustrate further details of the procedure three-dimensionally, a perspective view of the gearwheel workpiece 10 of FIG. 2 and a grinding wheel 207 is shown by way of example in FIG. 3. The head edge roundings 12.r, 12.1 of the gearwheel workpiece 10 are ground according to step e. in this example. The machine 200, the details of which can be seen schematically in FIGS. 2 and 3, comprises a first tool spindle 204 to accommodate and rotationally drive the first grinding tool 206 (a cup grinding wheel here). The first tool spindle 204 is associated with the axis A1. Moreover, this machine 200 comprises a second tool spindle 208 to accommodate and rotationally drive the second grinding tool 207 (a grinding wheel here). The second tool spindle 208 is associated with the axis A2. In this embodiment of the machine 200, the axis A2 extends perpendicularly to the axis A1. In the machine 200, which is shown in FIG. 4, the axis A2 extends parallel to the axis A1.

To be able to execute the method efficiently and with high precision, the machine tool 200 is equipped in at least some embodiments with a first tool spindle 204 for chucking the first grinding tool 206 and with a second tool spindle 208 for chucking the second grinding tool 207, as shown by way of example in FIG. 4.

To be able to bring the tools 206 and 207 into interaction with the gearwheel workpiece 10 for the grinding machining, in at least some embodiments, a relative infeed movement is executed before step d., to move the first grinding tool 206 into a first starting position in relation to the gearwheel workpiece 10. Moreover, before step e., a relative infeed movement is executed to move the second grinding tool 207 into a (second) starting position in relation to the gearwheel workpiece 10. Before the execution of step f., a further relative infeed movement is executed to move the first grinding tool 206, or possibly the second grinding tool 207, into a suitable starting position in relation to the gearwheel workpiece 10.

The method in at least some embodiments provides grinding finish machining of gearwheel workpieces 10 which were previously subjected to a temperature treatment. In other words, the finish machining is hard finish machining. The hard finish machining is used, on the one hand, to remove any possible hardness distortions of the gearwheel workpiece 10 and, on the other hand, to achieve the required surface quality.

The method can also be applied in principle to the milling machining of gearwheel workpieces.

In at least some embodiments, an NC-controller S is used (see FIG. 4) so that in step e., the head edge roundings 12.r, 12.1 are generated by means of NC-controlled movements of the second grinding tool 207 in relation to the gearwheel workpiece 10. The head edge roundings 12.r, 12.1 can be ground exactly as specified by the path-controlled movement of the second grinding tool 207 in relation to the gearwheel workpiece 10.

In at least some embodiments, instead of an NC-controller S, or in addition to the NC-controller S, a software module SM is used to be able to grind the head edge roundings 12.r, 12.1 exactly as specified.

FIG. 4 shows, as already mentioned, a perspective view of a grinding machine 200, in which the method can be used in at least some embodiments. A corresponding machine 200 comprises, in at least some embodiments, a first tool spindle 204 which is designed for chucking the first grinding tool 206. This first tool spindle 204 has a rotational drive, which enables it to rotationally drive the first grinding tool 206 around a first tool spindle axis A1. Furthermore, the machine 200 comprises a second tool spindle 208, which is designed for chucking the second grinding tool 207. This second tool spindle 208 has a separate rotational drive, which enables it to rotationally drive the second grinding tool 207 around a second tool spindle axis A2.

The two tool spindle axes A1 and A2 can extend in parallel, as shown in FIG. 4. However, in at least some embodiments, these axes A1 and A2 do not extend parallel to one another.

In at least some embodiments, a machine 200 additionally comprises a workpiece spindle 205, which is designed for chucking the gearwheel workpiece 10, as shown by way of example in FIG. 4. This workpiece spindle 205 has a separate rotational drive, which enables it to rotationally drive the gearwheel workpiece 10 in a controlled manner around a workpiece spindle axis B. In at least some embodiments, the workpiece spindle axis B is an NC-controlled axis.

In addition, in at least some embodiments, the machine 200 comprises further axes, which are at least partially NC-controlled. In the embodiment of FIG. 4, these are the linear axis X1, the linear axis X2, the linear axis Y, and the linear axis Z. These axes X1, X2, Y, Z can be perpendicular to one another, like the x, y, and z axes of a Cartesian coordinate system. However, other axis constellations are also possible.

In addition, in at least some embodiments, the machine 200 comprises a pivot axis, which is identified in FIG. 4 as the C axis and which is perpendicular to a plane which is spanned by the axes X1, X2, and Y.

To be able to perform the grinding machining of the tooth flanks 16.r, 16.1 using the first tool 206 in steps d. and f., the movements of the axes X1, Y, Z, B, and C are controlled by the NC-controller S, while the first grinding tool 206 is rotationally driven around the axis A1. In step f., as already mentioned, the first grinding tool 206 and/or the second grinding tool 207 can be used. If the second grinding tool 207 is used, the NC-controller S performs movements of the axes X2, Y, Z, B, and C, while the second grinding tool 207 is rotationally driven around the axis A2.

To be able to perform the grinding machining of the head edge roundings 12.r, 12.1 in step e., the movements of the axes X2, Y, Z, B, and C are controlled by the NC controller S and/or by a software module SM, while the second grinding tool 207 is rotationally driven around the axis A2.

A machine 200 may be used in at least some embodiments which—as shown by way of example in FIG. 4 —has a vertical constellation (configuration), in which the tools 206 and 207 are arranged hanging (upright) above the gearwheel workpiece 10.

In at least some embodiments, a cup grinding wheel is used in each case as the first grinding tool 206 and as the second grinding tool 207, wherein the second grinding tool 207 may have a smaller diameter than the first grinding tool 206.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A method, comprising:
    grinding finish machining a toothed gearwheel workpiece using an NC-controlled machine tool, wherein said grinding finishing machining includes:
    a. chucking the gearwheel workpiece in the machine tool;
    b. chucking a first grinding tool in the machine tool;
    c. chucking a second grinding tool in the machine tool;
    d. grinding machining of a tooth flank of the gearwheel workpiece using the first grinding tool;
    e. grinding machining of a transition region between the tooth flank and an adjacent tooth head of the gearwheel workpiece using the second grinding tool and thereby generating a rounded head edge on the gearwheel workpiece between said tooth flank and said tooth head; and
    f. after step (e), further grinding machining of the tooth flank using one or more of the first grinding tool or the second grinding tool.

2. The method according to claim 1, including executing steps d, e, and f during a single chucking of the gearwheel workpiece in the machine tool.

3. The method according to claim 1, wherein the machine tool comprises a first tool spindle configured for chucking the first grinding tool and a second tool spindle configured for chucking the second grinding tool.

4. The method according to claim 2, comprising:
    executing a relative infeed movement before step d and thereby moving the first grinding tool into a starting position relative to the gearwheel workpiece,
    executing a relative infeed movement before step e and thereby moving the second grinding tool into a starting position relative to the gearwheel workpiece,
    executing a relative infeed movement before step f and thereby moving the first grinding tool into a starting position relative to the gearwheel workpiece.

5. The method according to claim 1, comprising temperature treating the gearwheel workpiece before executing steps d to f.

6. The method according to claim 1, wherein the grinding finish machining comprises hard finish machining.

7. The method according to claim 1, wherein step e includes generating the rounded head edge using NC-controlled movements of the second grinding tool relative to the gearwheel workpiece.

8. The method according to claim 7, further comprising executing the NC-controlled movements using an NC-controller or a software module of the machine tool.

9. The method according to claim 2, wherein the machine tool comprises a first tool spindle configured for chucking the first grinding tool and a second tool spindle configured for chucking the second grinding tool.

10. The method according to claim 2, comprising temperature treating the gearwheel workpiece before executing steps d to f.

11. The method according to claim 3, comprising temperature treating the gearwheel workpiece before executing steps d to f.

12. The method according to claim 4, comprising temperature treating the gearwheel workpiece before executing steps d to f.

13. The method according to claim 2, wherein the grinding finish machining comprises hard finish machining.

14. The method according to claim 3, wherein the grinding finish machining comprises hard finish machining.

15. The method according to claim 4, wherein the grinding finish machining comprises hard finish machining.

16. The method according to claim 5, wherein the grinding finish machining comprises hard finish machining.

17. The method according to claim 2, further comprising executing the NC-controlled movements using an NC-controller or a software module of the machine tool.

18. The method according to claim 3, further comprising executing the NC-controlled movements using an NC-controller or a software module of the machine tool.

19. The method according to claim 4, further comprising executing the NC-controlled movements using an NC-controller or a software module of the machine tool.

* * * * *